United States Patent
Demers

(10) Patent No.: US 8,210,329 B2
(45) Date of Patent: *Jul. 3, 2012

(54) BRAKE PAD COOLING APPARATUS AND METHOD

(76) Inventor: Joseph R. Demers, Glendale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/017,017

(22) Filed: Jan. 30, 2011

(65) Prior Publication Data

US 2011/0120816 A1    May 26, 2011

(51) Int. Cl.
*F16D 65/10* (2006.01)
(52) U.S. Cl. .................. 188/264 R; 188/258; 188/264 A
(58) Field of Classification Search ............. 188/264 R, 188/71.6, 264 A, 264 AA, 250 R, 258, 218 L
See application file for complete search history.

(56) References Cited

U.S. PATENT DOCUMENTS

| 3,277,985 | A | 10/1966 | Caskey |
| 3,503,475 | A | 3/1970 | Mione |
| 3,592,297 | A | 7/1971 | Leffert |
| 4,989,697 | A | 2/1991 | Denton |
| 6,578,678 | B2 | 6/2003 | Lee |
| 7,111,710 | B2 | 9/2006 | O'Rourke |

FOREIGN PATENT DOCUMENTS

| JP | 64-022657 | 1/1989 |
| WO | WO2004/092607 | 10/2004 |

*Primary Examiner* — Pamela Rodriguez
(74) *Attorney, Agent, or Firm* — Pritzkau Patent Group, Inc

(57) ABSTRACT

An exemplary embodiment providing one or more improvements includes a brake cooling apparatus and method in which heat is conducted from a brake pad to a heat dissipating portion through a heat receiving portion and a heat dissipating portion dissipates the heat into a cooling medium.

8 Claims, 8 Drawing Sheets

BRAKE PAD COOLING APPARATUS AND METHOD

RELATED APPLICATIONS

The present application is a continuation application of U.S. patent application Ser. No. 11/439,401, filed on May 22, 2006 which claimed priority from U.S. Provisional Application Ser. No. 60/683,764, filed on May 24, 2005, U.S. Provisional Application Ser. No. 60/683,735, filed on May 24, 2005 and U.S. Provisional Application Ser. No. 60/711,760, filed Aug. 29, 2005, all of which are incorporated herein by reference.

BACKGROUND

A typical disk brake system of a vehicle includes a caliper with one or more pistons that hydraulically force brake pads toward one another and into contact with a rotor that spins relative to the caliper when the vehicle is moving. The pads have a high coefficient of friction so that when they are forced into contact with the spinning rotor during braking, the speed at which the rotor is spinning is decreased by the frictional contact between the pad and the rotor. As the rotor speed decreases, the kinetic energy of the rotor is converted into heat. Substantial amounts of heat can be generated in the brake pads. Brake pad temperatures can reach well over the melting point of aluminum, greater than about 600 degrees Celsius. Many different techniques or mechanisms are used to remove heat from the disk brake system through the rotor. An example of one mechanism is to provide an integral vent in the rotor through which ambient air moves when the rotor is spinning to cool the rotor. Prior to the present invention, heat was usually primarily removed from the brake pads through contact with the rotor, and through the brake fluid and the brake caliper via the hydraulic pistons.

The lack of a good thermal sink for the brake pad can lead to significant problems in some instances. One problem that arises when brake pads get hot is a condition in which the heat from the pad is conducted through the caliper piston to the brake fluid and causes the fluid to boil. Heat conducted through the caliper piston to the brake fluid can also lead to damaged brake caliper seals or warped caliper pistons. Another problem is a condition in which the brake pads get hot enough that they vaporize on contact with the rotor. In this condition, a cushion of gas is produced between the pad and the rotor which prevents the pad from contacting the rotor. Both of the above conditions lead to a decrease in brake efficiency which is also called fade. In extreme cases, the above conditions can result in a complete failure of the brake system.

Prior attempts have been made to address the problems arising from excessive heat in the brake pad and several patents have been issued which relate to cooling disk brake systems. However, these patents generally depend on the manufacture of specifically designed custom calipers or rotors that replace or modify the original equipment calipers on the vehicle. Examples of patents which require specially manufactured custom calipers are U.S. Pat. No. 5,002,160 and U.S. Pat. No. 6,446,766.

The '160 patent discloses a brake caliper that is specially manufactured to have a ventilation channel for ducting ambient air to a position between the brake pad backing plate and the piston of the caliper. Someone wishing to utilize the disk brake system disclosed in the '160 patent for cooling their brake pads would have to replace their calipers with the calipers disclosed in the '160 patent. Since the calipers are the most expensive component of the brake system, replacing the calipers with the specially manufactured calipers of the '160 patent is likely to be an expensive proposition.

The '766 patent discloses a specially constructed brake caliper which includes a duct that is formed inside of the body of the caliper. The duct is designed to direct air to a series of specially constructed hydraulic pistons. The pistons each have a radiator element through which the air from the duct flows to dissipate heat. The '766 patent is an example of a type of device which relies on a modified caliper and modified hydraulic pistons in an attempt to cool the brake pads. Specially constructing the caliper with air flow ducts adds to the complexity of the caliper and most likely also adds to the cost of manufacturing the caliper as well. In addition to the added cost of the caliper, the device described in the '766 patent also requires the hydraulic pistons to have radiator elements which would also have to be specially manufactured thereby increasing the cost of the device even further.

Other U.S. patents also require modified calipers in attempts to cool the brake pads in a disk brake system. What is needed is an effective disk brake pad cooling system which can be economically utilized without modifying or replacing expensive existing brake system components.

The foregoing examples of the related art and limitations related therewith are intended to be illustrative and not exclusive. Other limitations of the related art will become apparent to those of skill in the art upon reading of the specification and a study of the drawings.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

In general, a brake pad cooling apparatus and method are described for use with a disk brake system for a moveable vehicle. The disk brake system has a caliper which includes a hydraulic piston for moving a brake pad into forced contact with a rotor. The rotor rotates when the vehicle is moving and forced contact between the rotor and the brake pad reduces the rate at which the rotor is rotating to slow the movement of the vehicle. The contact also generates heat in the brake pad. The cooling apparatus comprises a thermally conductive sheet for positioning into thermal communication with the brake pad. The conductive sheet includes a thermally conductive material for conducting heat away from the brake pad. The cooling apparatus also includes a heat sink which is thermally connected to the conductive sheet to allow heat to pass from the conductive sheet to the heat sink. The heat sink is positioned away from the brake pad when the conductive sheet is in thermal contact with the brake pad and the heat sink includes at least two cooling fin members for dissipating heat into the surrounding air. During operation, the heat sink receives heat from the brake pad through the conductive sheet and dissipates the heat into the surrounding air to cool the brake pad.

In another embodiment, a method for cooling a brake pad in a disk brake system of a moveable vehicle is disclosed. The disk brake system has a caliper which includes a hydraulic piston for moving a brake pad into forced contact with a rotor that rotates when the vehicle is moving. The forced contact between the rotor and the brake pad reduces the rate at which the rotor is rotating to slow the movement of the vehicle and the contact generates heat in the brake pad. A thermally conductive sheet is inserted between the brake pad and the hydraulic piston to receive the heat from the brake pad. A heat sink that includes at least two cooling fin members and which is attached to the thermally conductive sheet is positioned at a location that is away from the brake pad and is generally surrounded by air. The heat sink receives heat from the brake pad through the conductive sheet and dissipates the heat to the surrounding air with the cooling fin members.

In yet another embodiment, a brake pad cooling apparatus and associated method are described for use with a disk brake system for a moveable vehicle. The disk brake system has a caliper which includes a peripheral outline and has a hydraulic piston for moving a brake pad into forced contact with a rotor. The rotor rotates when the vehicle is moving and forced contact between the rotor and the brake pad reduces the rate at which the rotor is rotating to slow the movement of the vehicle. The contact also generates heat in the brake pad. A heat receiving portion of the apparatus is in thermal communication with the brake pad and a distal heat dissipating portion extending out of the peripheral outline of the caliper is in thermal communication with the heat receiving portion. The heat dissipating portion receives heat from the heat receiving portion by thermal conduction and thereafter dissipates the heat into the ambient environment.

In addition to the exemplary aspects and embodiments described above, further aspects and embodiments will become apparent by reference to the drawings and by study of the following descriptions.

DETAILED DESCRIPTION

Figure 1:
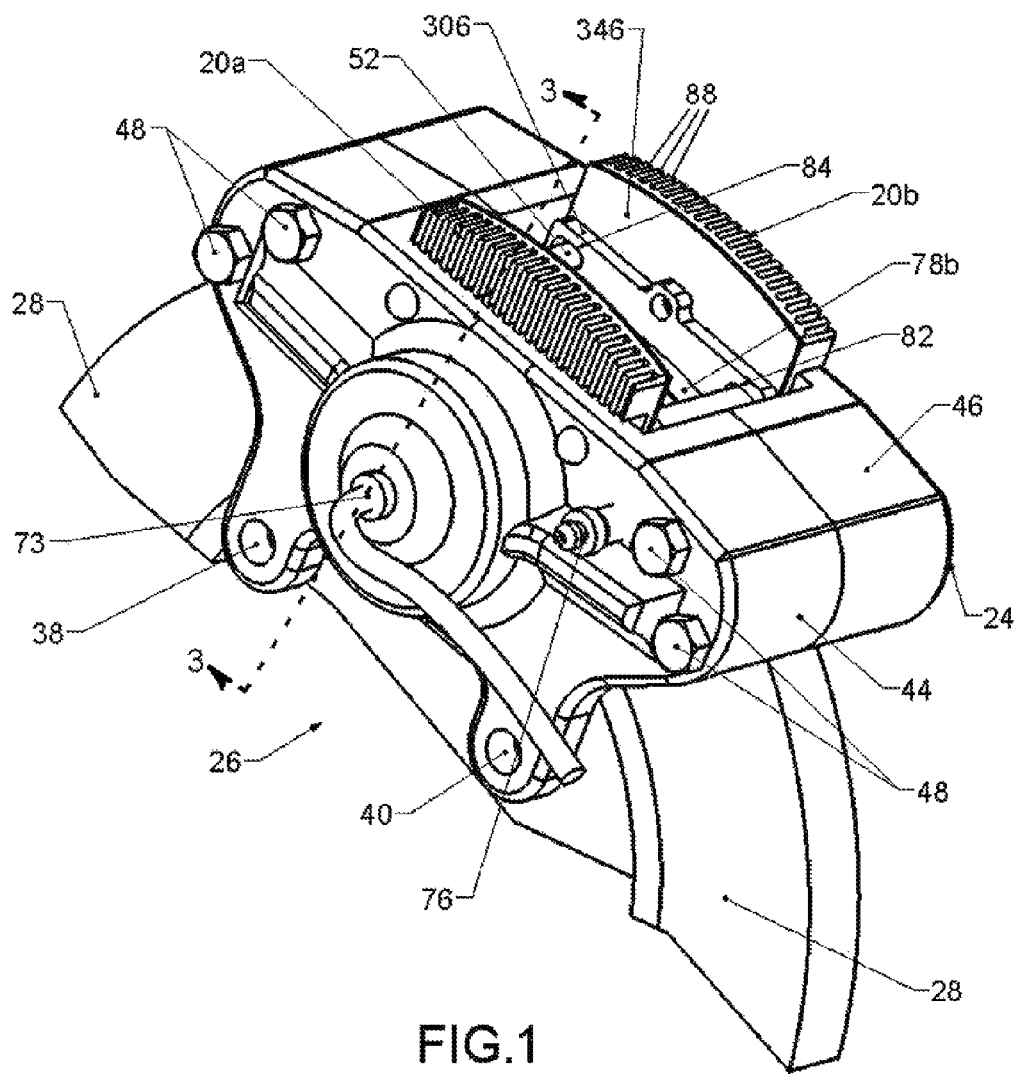
FIG. 1 is a perspective view of disk brake coolers according to the present disclosure installed in a caliper of a disk brake system.

Disk brake coolers 20a and 20b, which may be referred to individually or collectively by the reference number 20, according to the present invention are shown in FIG. 1 installed in a disk brake caliper 24. Caliper 24 is mounted to a chassis of a vehicle (not shown) for use as part of a disk brake system 26 that includes a rotor 28 which rotates as the vehicle moves. Brake pad assemblies 30 and 32 (FIG. 3) engage rotor 28 to slow or stop the rotation of rotor 28 which then slows or stops the vehicle movement. When brake pad assemblies 30 and 32 engage and slow or stop the rotation of rotor 28, the rotational or kinetic energy of rotor 28 and the momentum of the vehicle are converted into heat in brake pad assemblies 30 and 32 and in rotor 28.

Figure 2:
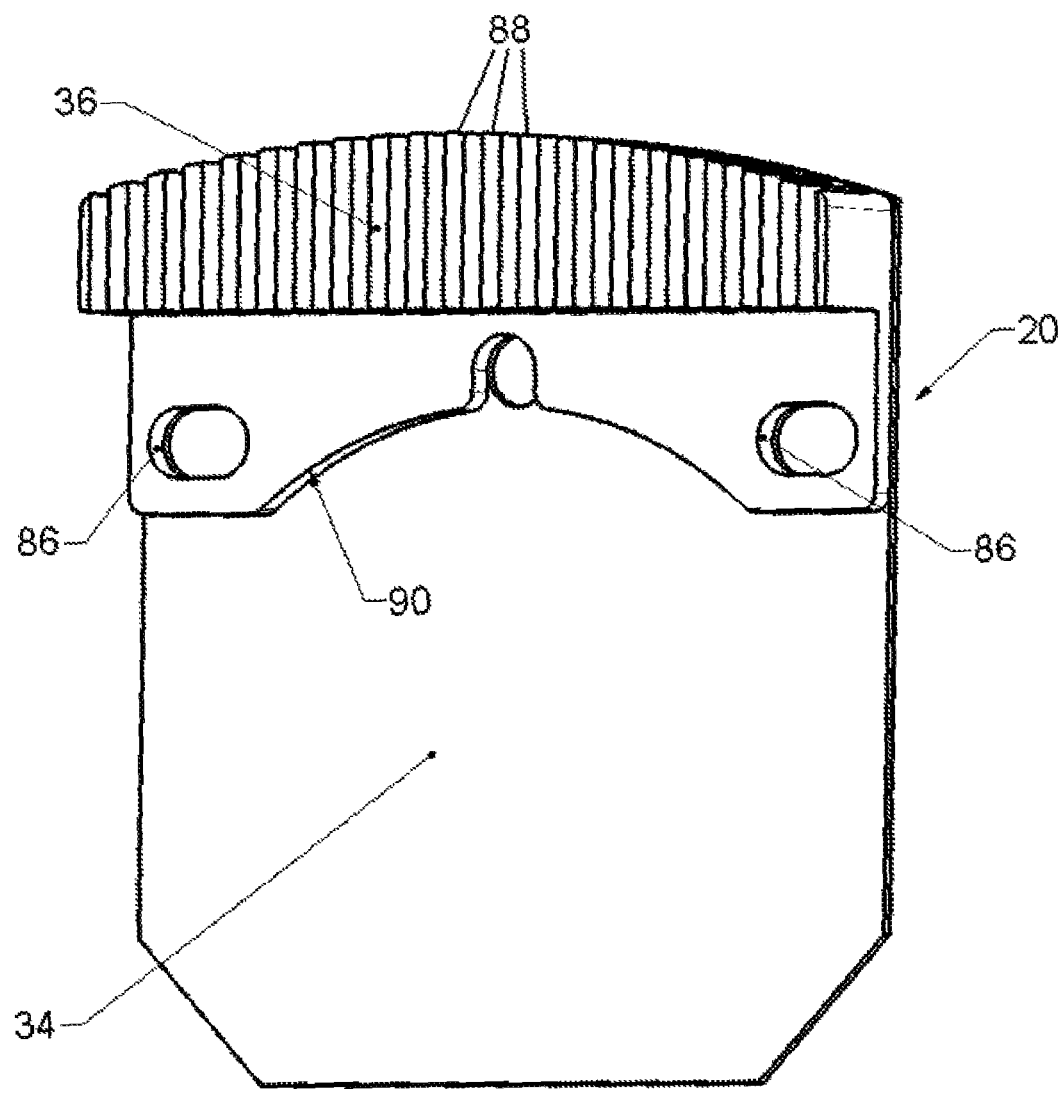
FIG. 2 is an enlarged perspective view of the disk brake coolers shown in FIG. 1.

Disk brake coolers 20, one of which is shown in FIG. 2, take advantage of thermal conduction to flow heat from brake pad assemblies 30 and 32 to a position where the heat is more efficiently transferred to the atmosphere. Brake coolers 20 each include a thermally conductive sheet 34 and a heat sink 36. Brake cooler 20a includes thermally conductive sheet 34a and heat sink 36a, and brake cooler 20b includes thermally conductive sheet 34b and heat sink 36b. Sheets 34a and 34b are integrally formed or connected to heat sinks 36a and 36b, respectively, for conducting heat between sheets 34a and 34b and heat sinks 36a and 36b.

Figure 3:
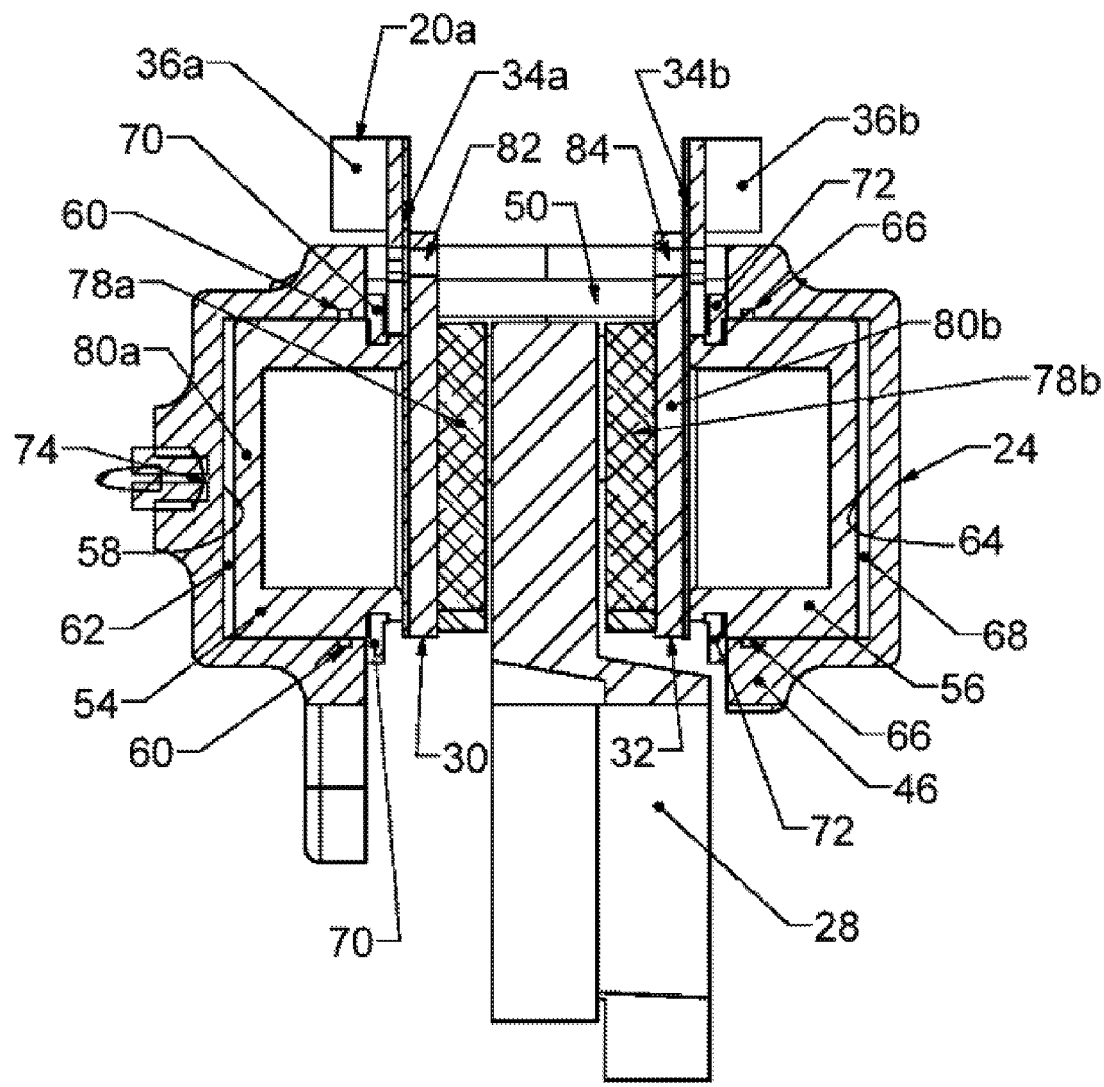
FIG. 3 is a cross section view of the disk brake coolers and caliper taken along a cross sectional line 3-3 shown in FIG. 1.

When brake coolers 20a and 20b are installed in caliper 24 (FIG. 1), conductive sheets 34a and 34b are in thermal contact with brake pad assemblies 30 and 32, respectively, and heat is transferred from brake pad assemblies 30 and 32 to sheets 34a and 34b, respectively. The heat is conducted from sheet 34a to heat sink 36a, and from sheet 34b to heat sink 36b. Heat sinks 36 extend out of caliper 24, as shown in FIGS. 1, 3 and 5, where the heat sinks 36 transfer the heat to a cooling medium, such as surrounding air or a fluid in a cooling system, thereby removing the heat from brake assemblies 30 and 32 and decreasing the temperature found in the brake assemblies.

Figure 5:
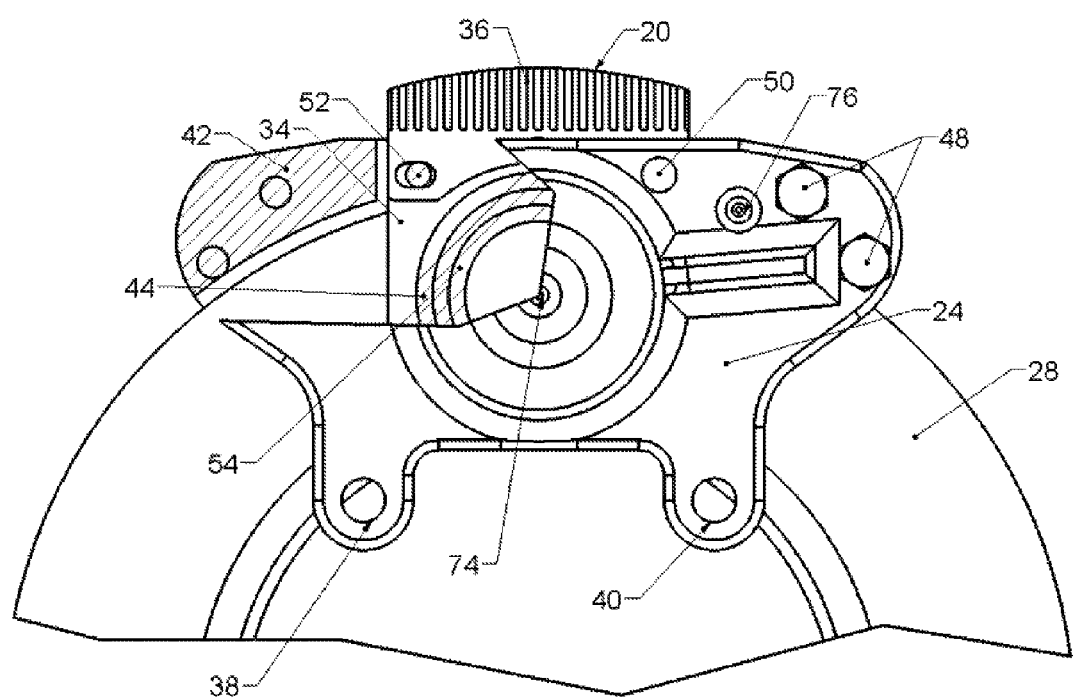
FIG. 5 is a partially cut away elevation view of the disk brake coolers and caliper shown in FIG. 1.

Caliper 24, shown in FIGS. 1 and 5, is bolted to the vehicle suspension or other components of the vehicle chassis (not shown) through mounting holes 38 and 40. The caliper defines a peripheral outline 42, from which heat sinks 36 shown in FIG. 5 extend when brake coolers 20a and 20b are installed in caliper 24. Heat sinks 36 are positioned at least partially extending from the peripheral outline 42 to subject heat sinks 36 to greater air flow for cooling.

Figure 4:
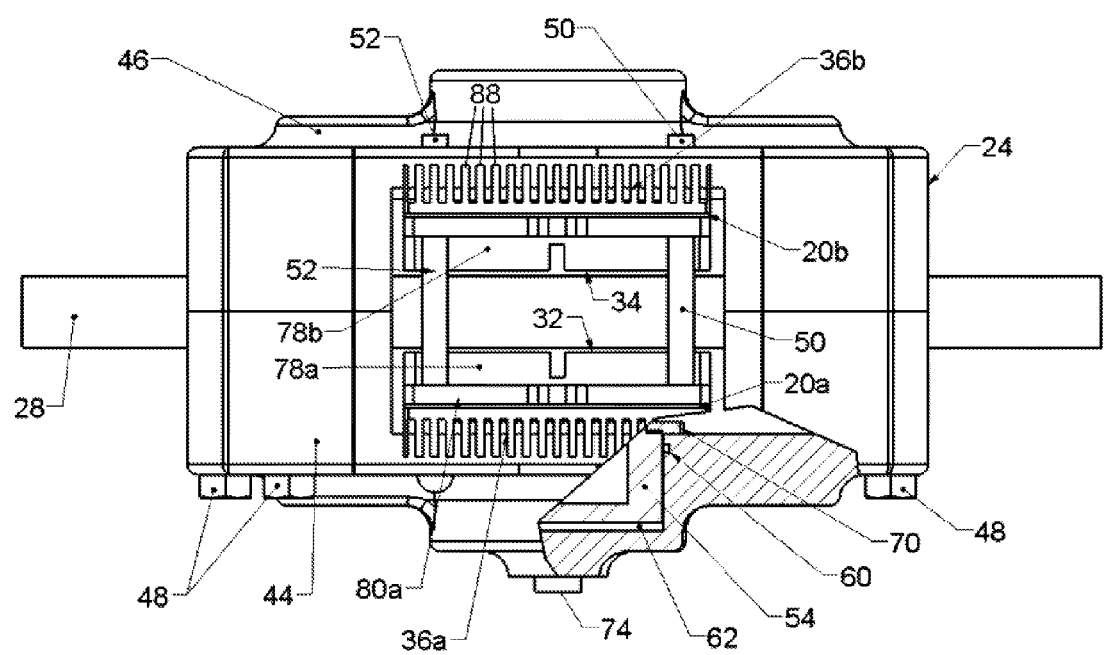
FIG. 4 is a partial cut away view of the disk brake coolers and caliper shown in FIG. 1.

Details of the operation of disk brake coolers 20a and 20b are discussed below along with details of the operation of disk brake system 26. In many instances brake coolers 20a and 20b can be essentially the same as one another except for their orientation with respect to one another when installed in the caliper 24. Caliper 24, of disk brake system 26, includes an inner caliper half 44 and an outer caliper half 46 which are connected together using caliper bolts 48 (FIGS. 1 and 4). Guide pins 50 and 52 extend between inner and outer caliper halves 44 and 46 for restraining brake pad assemblies 30 and 32 against unwanted movement relative to caliper 24 during application of brake pad assemblies 30 and 32 to rotor 28 and during other times. Inner caliper half 44 (FIG. 3) houses an inner hydraulic piston 54 which moves within the inner caliper half to force brake pad assembly 30 into contact with rotor 28. Outer caliper half 46 houses an outer hydraulic piston 56 which moves within outer caliper half 46 to force brake pad assembly 32 into contact with rotor 28.

Inner hydraulic piston 54 is positioned in an inner cylinder bore 58 of inner caliper 44, (FIG. 3) for movement toward and away from rotor 28. A hydraulic seal 60 creates a fluid tight seal between the outer surface of piston 54 and the inner surface of cylinder bore 58 which together define an inner fluid reservoir 62. Outer hydraulic piston 56 is positioned in an outer cylinder bore 64 of outer caliper 46 for movement toward and away from rotor 28. A hydraulic seal 66 creates a fluid tight seal between the outer surface of piston 56 and the inner surface of outer cylinder bore 64 which together define an outer fluid reservoir 68. An inner dust shield 70 and outer dust shield 72 are positioned to prevent dust and other material from contacting hydraulic seals 60 and 66, respectively.

Inner and outer fluid reservoirs 62 and 68 are fluidly connected to one another with a fluid passage (not specifically shown) and the inner fluid reservoir 62 is connected to a hydraulic brake line 73 (FIG. 1) through an orifice 74 (FIGS. 3 and 5) in inner caliper 44. Inner and outer fluid reservoir 62 and 68 (FIG. 3), the fluid passage and the hydraulic brake line are filled with a brake fluid (not shown) and excess air is removed through a bleeder screw 76 (FIG. 1).

In order to move the brake assemblies into forced contact with rotor 28, brake fluid is moved from brake line 73 into inner fluid reservoir 62 through orifice 74 and to outer fluid reservoir 68 through the fluid passage. Fluid reservoirs 62 and 68 expand to receive the increased amount of brake fluid and pistons 54 and 56 are thereby moved toward rotor 28, which moves the brake assemblies into contact with rotor 28. Movement of brake assemblies 30 and 32 away from rotor 28 is accomplished when hydraulic pressure is released such that brake fluid is release from fluid reservoirs 62 and 68 and fluid reservoirs 62 and 68 are contracted. Release of brake fluid from fluid reservoirs 62 and 68 causes pistons 54 and 56 to move away from rotor 28 thereby relieving the forced contact between brake assemblies 30 and 32 and rotor 28. Inner and outer dust shields 70 and 72 contribute to the movement of pistons 54 and 56 away from rotor 28. Although the present example is described in conjunction with a caliper having a single piston on either side of the rotor, the disk brake cooler can be used with other calipers having multiple hydraulic pistons on either side, or a single piston on one side.

Brake pad assemblies 30 and 32 each include two components, a brake pad 78 and a backing plate 80, as shown in FIG. 3. Brake pad assembly 30 includes brake pad 78a and backing plate 80a while brake pad assembly 32 includes brake pad 78b and backing plate 80b. Brake pads 78a and 78b are forced toward one another to contact rotor 28 with hydraulic pistons 54 and 56 (FIG. 3) through backing plates 80a and 80b. Contact between pads 78 and rotor 28 causes rotor 28 to slow and also causes pads 78 and rotor 28 to heat up. Heat from pads 78a and 78b normally conducts to backing plates 80a and 80b and pistons 54 and 56, respectively, as well as to caliper 24 and to the brake fluid, among other parts. Brake pads 78 are typically made of a combination of several materials that are able to withstand certain temperatures and which also have an abrasive surface to create the friction between pads 78 and rotor 28 when pads 78 are forced into contact with rotor 28. Brake pads 78 are typically cast or otherwise fastened to backing plates 80, which are used to connect brake assemblies 30 and 32 to caliper 28.

Backing plates 80 include slots or holes 82 and 84 (FIGS. 1 and 3) which interact with guide pins 50 and 52 to generally constrain brake pad assemblies 30 and 32 against movement relative to caliper 24 in any direction except toward and away from one another. Other methods are also used for constraining backing plates, such as clips (not shown). When brake pads 78 are pressed against rotor 28, a rotational force of the rotating rotor is applied to brake pad assemblies 30 and 32 from rotor 28. Holes 82 and 84 engage pins 50 and 52 to resist this rotational force and in this way the rotational force of rotor 28 is resisted by caliper 24 when brake pads 78 are pressed against rotor 28. Backing plates 80 are constructed of a material which is able to resist the forces at holes 82 and 84 and pins 50 and 52. Backing plates 80 also have yield properties which resist deformation when hydraulic pistons 54 and 56 are forcing brake pads 78 into contact against rotor 28.

Brake coolers 20a and 20b shown in FIGS. 1 and 3 are positioned with conductive sheets 34a and 34b of brake coolers 20a and 20b interposed between backing plates 80a and 80b and pistons 54 and 56, respectively. Brake coolers 20a and 20b include guide pin slots or holes 86 (FIGS. 2 and 5) which align with guide pins 50 and 52 or other mounting hardware of the brake pad assemblies when brake coolers 20a and 20b are installed in caliper 24. Conductive sheets 34 shown in FIG. 2 include a shape that is similar to a shape of backing plates 80.

To engage pads 78 against rotor 28 when brake coolers 20a and 20b are installed (FIG. 3), pistons 54 and 56 apply pressure to backing plates 80a and 80b through conductive sheets 34a and 34b, respectively. Since considerable pressure is applied by pistons 54 and 56, conductive sheets 34 include a high yield strength material such as stainless steel that resists deformation from the applied pressures. When positioned as shown in FIGS. 1 and 3, the heat from brake pads 78 is transferred through backing plates 80 to conductive sheets 34. Therefore, the high yield material of conductive sheets 34 is also able to resist deformation at the temperatures of the heat conducted through backing plates 80.

Conductive sheets 34 conduct the heat from backing plates 80 to heat sinks 36. In order to maximize the conduction of heat to heat sinks 36, conductive sheets 34 include a high thermal conductivity material such as copper. Conductive sheets 34 of the present example have a thermal conductivity greater than 100 Watts/meter-Kelvin. Other materials can also be used for the conductive sheet, for example copper tungsten has high yield strength and a high thermal conductivity.

When one of the conductive sheets is inserted between the backing plate and the piston, the overall distance between the piston and brake pad is increased. This makes pads 78 closer to rotor 28 when brake coolers 20a and 20b are installed than when brake coolers 20a and 20b are not installed by an amount generally equal to the thickness of conductive sheet 34. A thicker conductive sheet generally has an ability to conduct more heat than a thinner conductive sheet of the same material. However, if the conductive sheet is too thick, then the brake pad assembly and the conductive sheet of the brake cooler will not fit between the piston and the rotor. The thickness of conductive sheets 34 are chosen to maximize the thermal cross section of the thermal path to heat sink 36 while minimizing the impact on displacing a set of new brake pad assemblies. Conductive sheets 34 of the present example are 1 millimeter thick.

Heat sinks 36 receive heat from brake pad assemblies 30 and 32 through conductive sheets 34. Heat sinks 36 shown in FIG. 1 are positioned remotely away from brake pads 78 and externally to caliper 24 where heat sinks 36 are in contact with surrounding air flow. As is apparent from the configuration and position shown in FIG. 1, heat sinks 36 will not interfere with a wheel (not shown) when the wheel is attached to the vehicle.

Heat sinks 36 shown in FIGS. 1 and 2 include an arrangement of cooling fin members 88 which extend in a row. Cooling fin members 88 provide a large surface area in which to transfer heat from heat sink 36 to the surrounding air. Cooling fin members 88 shown in FIG. 4 extend in a direction that is perpendicular to a plane defined by rotor 28. Typically two or more cooling fin members provide surface area for dissipating heat conducted to heat sinks 36 from conductive sheets 34 when the heat sinks are exposed to air flow in the position shown in FIG. 1. The cooling fin members can be formed in a variety of different shapes, so long as the shape allows the fin member to dissipate heat. In addition, the cooling fin members can be arranged in the heat sink in a variety of different ways so long as the arrangement allows the fin members to dissipate heat. For example, the cooling fin members can be transverse to the plane of the rotor and need not be parallel with respect to one another.

In the example shown in FIG. 1, heat sinks 36 are attached to conductive sheets 34 using brazing or mechanical fasteners. Since heat sinks 36 are not subject to the same pressures that conductive sheets 34 are, heat sinks 36 can be constructed of copper. In some instances the size and weight of heat sink 36 is such that high gravity force (G-force) maneuvering of the vehicle will cause stress in the connection between heat sink 36 and conductive sheet 34. One way in which to prevent heat sink 36 from folding or otherwise deforming conductive sheet 34 in these instances is to form heat sink 36 with a shape that prevents a single linear stress point such as a curved shape 90 shown in FIG. 2.

Installation of brake coolers 20a and 20b is fairly simple and in most instances will be similar to the installation of brake pad assemblies 30 and 32. Once access to caliper 24 is gained, pistons 54 and 56 are moved into caliper 24 away from rotor 28 thereby creating a space between brake pad assemblies 30 and 32 and pistons 54 and 56, respectively. Conductive sheets 34a and 34b are then inserted between brake pad assemblies 30 and 32 and pistons 54 and 56 which leaves heat sinks 36a and 36b at a position away from brake pads 78a and 78b. Conductive sheets 34 can also be inserted between brake pad assemblies 30 and 32 and pistons 54 and 56 by installing brake pad assemblies 30 and 32 after conductive sheets 34 are installed in caliper 24.

In the previous example, the brake coolers were described as an accessory to a standard brake assembly that includes the backing plate. In another example of the brake coolers, the thermally conductive sheet is utilized as the backing plate. In this instance the brake pad is permanently attached to the thermally conductive sheet and the heat sink is connected to the conductive sheet as before. Since the thermally conductive sheet replaces the backing plate, the thermally conductive sheet can have a larger thickness while still being able to be positioned between the brake pad and the piston. This configuration is also beneficial in that the larger thickness allows for relatively large amounts of thermally conductive material to conduct the heat from the brake pad to the heat sink.

Figure 6:
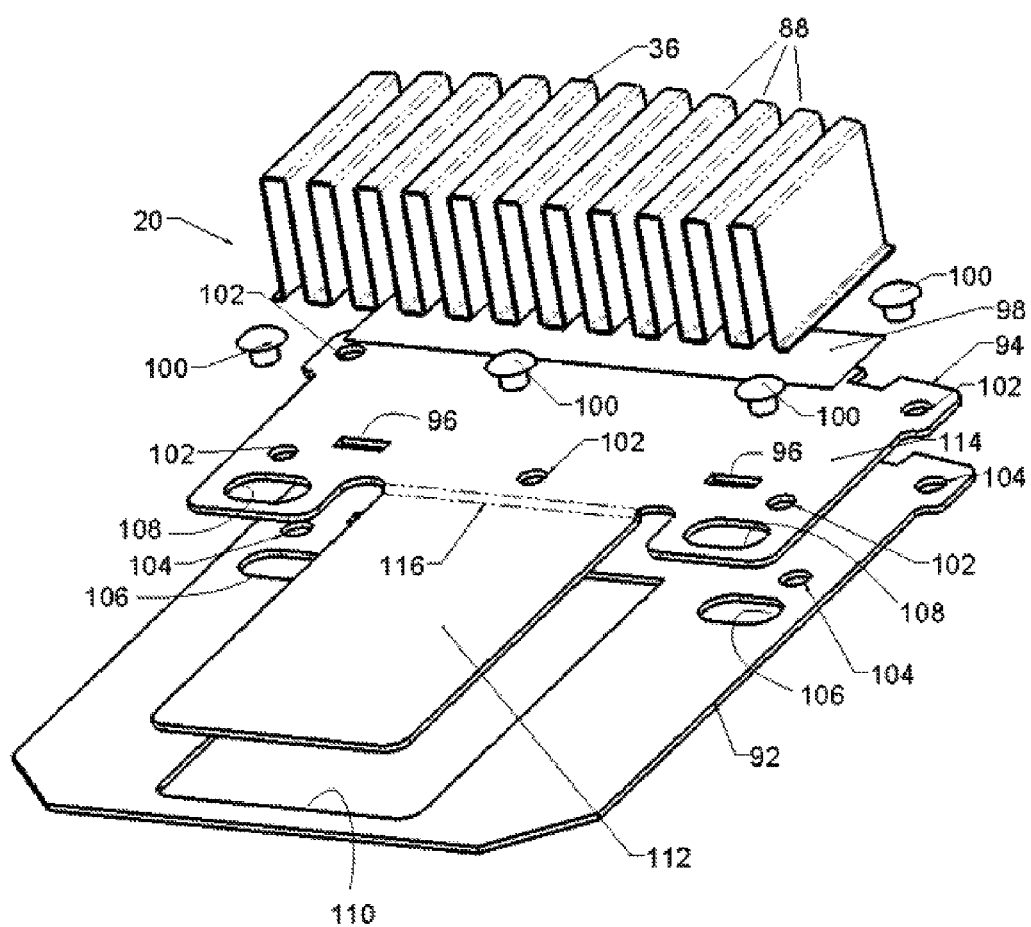
FIG. 6 is a perspective exploded view illustrating components of the disk brake cooler shown in FIG. 1.

Another embodiment of the brake cooler is described in conjunction with FIG. 6. In this embodiment, conductive sheet 34 is constructed of a primary sheet 92 and a secondary sheet 94 that are secured to one another. Heat sink 36 is constructed of a thermally conductive material such as copper that is folded into a series of cooling fin members 88. The cooling fin members 88 provide a surface area for transferring heat from heat sink 36 to cooling medium. The cooling fin members 88 shown in FIG. 6 have a relatively large surface area for transferring heat to surrounding air. Heat sink 36 in FIG. 6 is connected to the conductive sheet 34 by aligning heat sink 36 with alignment holes 96 and then using a braze material 98 that is heated to adhere to the heat sink 36 and the conductive sheet 34.

In the embodiment shown in FIG. 6, the primary sheet 92 is secured to the secondary sheet 94 using rivets 100. The rivets 100 extend through holes 102 in the secondary sheet 94 and holes 104 in the primary sheet 92 before being expanded to physically secure the sheets 92 and 94 to one another. When the primary and secondary sheets 92 and 94 are secured to one another, the guide pin holes are formed by cooperative alignment of a primary sheet guide hole 106 and a secondary sheet guide hole 108.

The overall conductive sheet 34, described above, is constructed using primary and secondary sheets 92 and 94 which have a complementary shape. In the instance shown in FIG. 6, primary sheet 92 defines a heat pickup hole 110 in which a heat pickup portion 112 of secondary sheet 94 fits. When heat pickup portion 112 is positioned in heat pickup hole 110, the combination of heat pickup portion 112 and primary sheet 92 surrounding heat pickup hole 110 generally define a planar surface of conductive sheet 34. Secondary sheet 94 also includes a heat sink portion 114 which is sandwiched between primary sheet 92 and heat sink 36. A step 116 of secondary sheet 94 transitions between heat pickup portion 112 and heat sink portion 114 of secondary sheet 94. Step 116 allows heat pickup portion 112 to be positioned in heat pickup hole 110 of primary sheet 92 and heat sink portion 114 to be positioned at the surface of the primary sheet 92.

In the embodiment shown in FIG. 6, secondary sheet 94 is constructed of a high thermal conductivity material, for example copper. When installed in caliper 24, heat pickup portion 112 of secondary sheet 94 is positioned between the backing plate and the piston. Heat pickup portion 112 receives heat from the backing plate and conducts the heat to the heat sink portion 114 where the heat is then transferred to heat sink 36. The heat sink shown in FIG. 6 has a large surface area that is in contact with the cooling medium, which in this case is ambient air. Because of the large surface area of the heat sink, heat is transferred from the heat sink to the cooling medium in an efficient manner. Removing heat through the heat pickup portion decreases the amount of heat that reaches the piston, thereby cooling the piston and decreasing or eliminating the occurrence of the piston and the other associated components overheating and boiling the brake fluid.

Also in the embodiment shown in FIG. 6, the primary sheet 92 is constructed of a high yield strength material such as stainless steel. When installed, in caliper 24 the primary sheet is positioned between the backing plate and the piston with the primary sheet extending substantially the entire distance across the backing plate and the piston contacting the primary sheet on opposite sides of heat pickup hole 110. Positioned in this way, primary sheet 92 resists deformation from the compressive force applied by the piston during braking and generally prevents the piston from deforming the heat pickup portion 112 of secondary sheet 94. A sheet of high yield strength and high thermal conductivity material, such as copper tungsten, can be substituted for the combination of the primary and secondary sheets.

Figure 7:
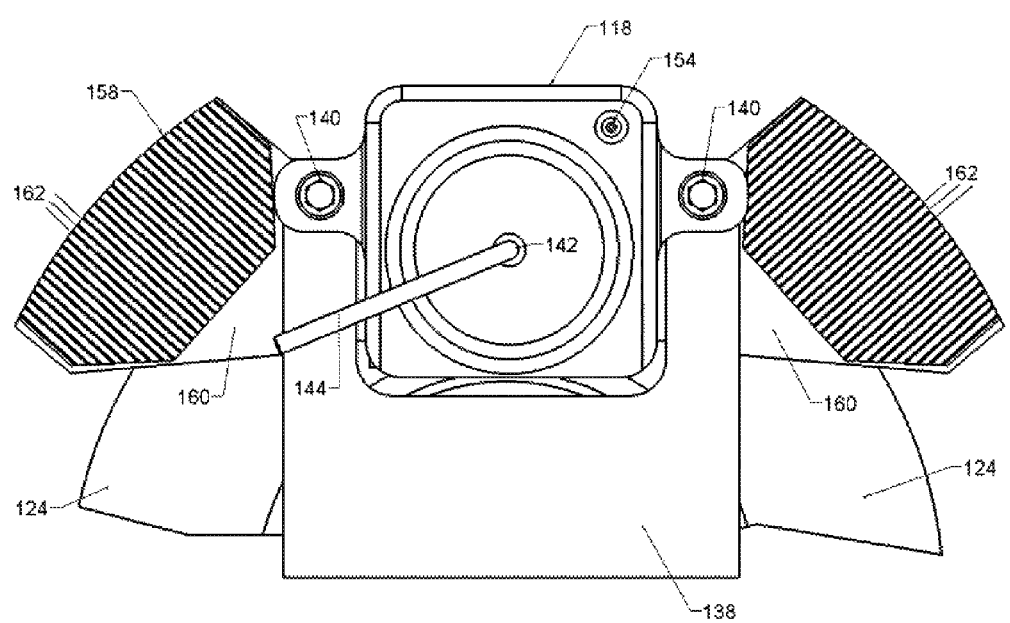
FIG. 7 is a view of another disk brake cooler according to the present disclosure installed in a caliper of a disk brake system.
Figure 8:
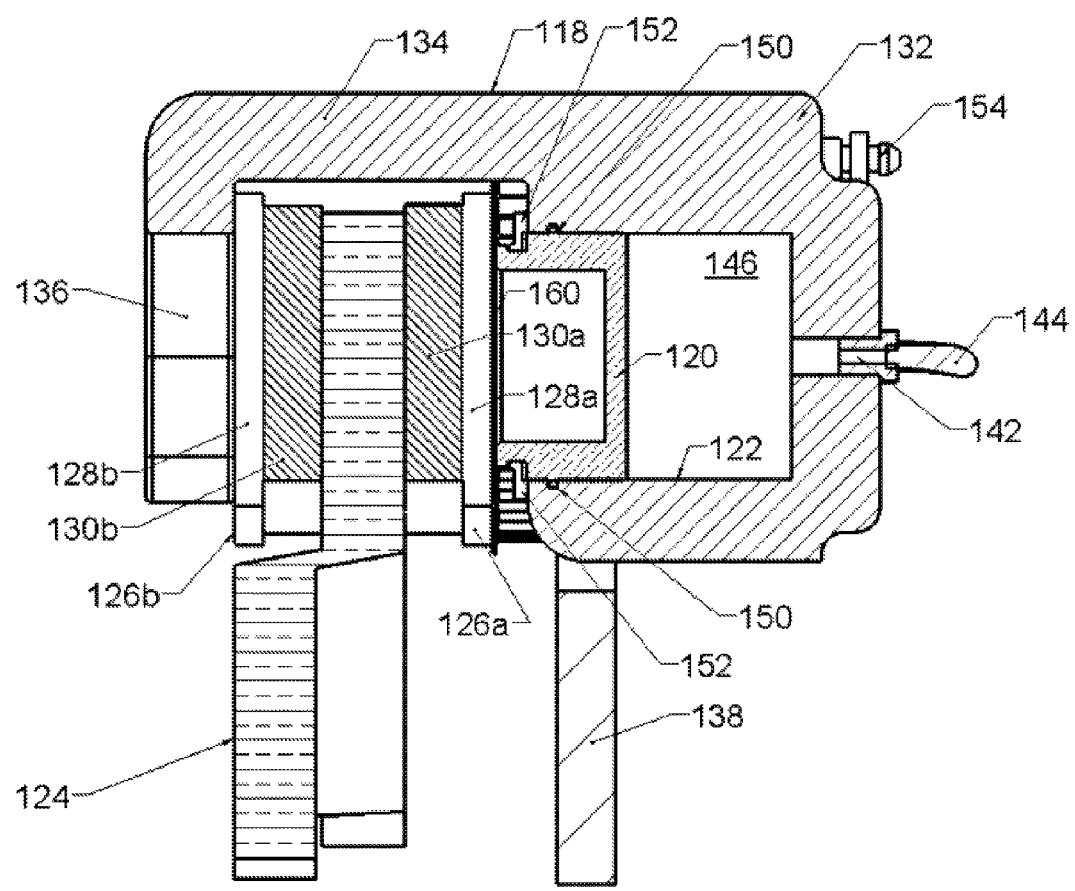
FIG. 8 is a cross section view of the disk brake cooler and caliper shown in FIG. 7.

Yet another embodiment of the brake cooler is described in conjunction with FIGS. 7 and 8 for use with a single piston caliper 118. Single piston caliper 118 includes a single piston 120 (FIG. 8) which moves laterally in a cylinder 122 relative to a rotor 124 to move inner and outer brake assemblies 126a and 126b toward and away from the rotor. Each of the brake assemblies shown in FIGS. 7 and 8 includes a backing plate 128 and a brake pad 130. A caliper body 132 of the caliper extends around rotor 124 with a caliper cross member 134 and caliper arms 136 engage the outer brake assembly 126b. To engage the rotor with the brake assemblies, piston 120 moves toward the caliper arms 136 which cause the brake assemblies to move toward one another and forcibly engage the rotor. Single piston caliper 118 is connected to a mounting bracket 138 of a vehicle (not shown) using mounting bolts 140 (FIG. 7).

Movement of piston 120 is produced by hydraulic fluid passing through an orifice 142 to and from a brake line 144. The hydraulic fluid enters a fluid reservoir 146 (FIG. 8) defined by an interior surface of cylinder 122 and exterior surface of piston 120. A hydraulic seal 150 extends around piston 120 to contain the fluid in fluid reservoir 146 and a dust shield 152 prevents dust and other contaminants from damaging the hydraulic seal. A bleeder screw 154 is included to remove air from the fluid reservoir.

The brake cooler 20 in the embodiment shown in FIGS. 7 and 8 includes two heat sinks 156 and 158 which are connected in a spaced apart relationship with a thermally conductive sheet 160. Heat sinks 156 and 158 each include fin members 162 for transferring heat to the surrounding atmosphere. Heat sink 156 is positioned on one side of caliper cross member 134 and heat sink 158 is positioned on another side of caliper cross member 134.

Thermally conductive sheet 160 is sandwiched between piston 120 and backing plate 128a of the inner brake pad assembly 126a. Sheet 160 includes a high yield strength material such as stainless steel that resists deformation from the applied pressures, and a high thermal conductivity material that conducts heat from the brake pad assembly to heat sinks 156 and 158. A single heat sink may also be used with the single piston caliper, on either the forward or rearward side of caliper cross member 134. Moreover, an additional brake cooler can be installed between brake pad assembly 126b and caliper arms 136 for removing heat from outer brake pad assembly 126b.

The brake coolers provide an effective mechanism for removing heat from the brake pads without having to modify the caliper or other components of the disk brake system. Since the calipers do not have to be replaced to install the brake coolers, the brake coolers are more economical than other systems which do require the replacement of calipers or other expensive components.

Removal of the heat from the brake pads with the brake coolers lowers the heat level experienced by the hydraulic brake fluid, which can thereby eliminate or substantially reduce the dangerous incidence of the brake fluid boiling. The heat removal may also eliminate or reduce the incidence of heat induced damage to the pistons, seals and other components of the caliper which can also lead to brake failure. The removal of heat from the brake pads by the brake coolers is also beneficial in helping to reduce or eliminate instances where the pads are heated to the point where they vaporize on contact with the rotor. Removing heat from the brake pad can result in the temperature of the pad remaining below the point where pad vaporization occurs, thereby substantially or completely eliminating brake pad vaporization. Reducing or eliminating the occurrences of brake fluid boiling and brake pad vaporization increases brake efficiency and may improve the safety of the vehicle to which the brake coolers are attached.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. A brake cooling apparatus for use in a disk brake system of a moveable vehicle, the disk brake system having a caliper which includes a hydraulic piston, and a brake pad assembly which includes a brake pad and a backing plate having a first major side to which the brake pad is fixedly attached and a second major side that is opposite from the first major side, the brake pad assembly removably connected to the caliper, the caliper hydraulic piston arranged for contacting the second major side of the backing plate to selectively move the brake pad into a forced contact with a rotor that rotates when the vehicle is moving, where the forced contact between the rotor with the brake pad reduces the rate at which the rotor is rotating to slow the movement of the vehicle and the forced contact generates heat in the brake pad that conducts through the brake pad to the first major side of the backing plate and through the backing plate to the second major side of the backing plate, the cooling apparatus comprising:

a thermally conductive sheet including a first major surface configured for positioning in thermal communication against the second major side of the backing plate in a confronting relationship with the second major side to receive heat from the brake pad assembly when the brake pad assembly is installed in the brake caliper, the thermally conductive sheet positioned without any fixed attachment to either the brake pad assembly or the caliper, the conductive sheet including a thermally conductive material for conducting heat away from the brake pad assembly and the conductive sheet including a second major surface that is opposite from the first major surface and which is in confronting relationship with the caliper hydraulic piston when the first major surface is positioned in thermal communication with the backing plate; and a heat dissipating arrangement in thermal communication with said thermally conductive sheet for receiving the heat from the thermally conductive sheet by thermal conduction and, thereafter, for dissipating the heat into a cooling medium.

2. A brake cooling apparatus as defined in claim 1 wherein the thermally conductive sheet includes a guide feature for maintaining the thermally conductive sheet in thermal communication with the second major side of the backing plate without any fixed attachment to either the caliper or the brake pad assembly.

3. A brake cooling apparatus as defined in claim 1 wherein the conductive sheet includes a thickness between the first and second major surfaces which allows the thermally conductive sheet to be arranged between the second major side of the backing plate and the hydraulic piston without modification to the brake pad assembly and the caliper.

4. A brake cooling apparatus as defined in claim 1 wherein the thermally conductive material in the thermally conductive sheet is copper.

5. A brake cooling apparatus as defined in claim 1 wherein the thermally conductive material in the thermally conductive sheet is copper tungsten.

6. A brake cooling apparatus as defined in claim 1 wherein the heat dissipating arrangement includes cooling fin members that are arranged such that the heat is dissipated into cooling medium that is ambient air.

7. A brake cooling apparatus as defined in claim 1 wherein the conductive sheet includes a high yield strength material in addition to the thermally conductive material, the high yield strength material has higher yield strength than the thermally conductive material and is arranged to resist compression of the conductive sheet imposed by the piston.

8. A vehicle disk brake system for use with a moveable vehicle, the disk brake system having a caliper which includes a hydraulic piston, and a brake pad assembly which includes a brake pad and a backing plate having a first major side to which the brake pad is fixedly attached and a second major side that is opposite from the first major side, the brake pad assembly removably connected to the caliper, the caliper hydraulic piston arranged for contacting the second major side of the backing plate to selectively move the brake pad into a forced contact with a rotor that rotates when the vehicle is moving, where the forced contact between the rotor with the brake pad reduces the rate at which the rotor is rotating to slow the movement of the vehicle and the forced contact generates heat in the brake pad that conducts through the brake pad to the first major side of the backing plate and through the backing plate to the second major side of the backing plate, the brake system including a cooling apparatus having a heat receiving portion in thermal communication with the second major side of the backing plate to receive the heat from the backing plate without any fixed attachment to either the brake pad assembly or the caliper and the cooling apparatus having a heat dissipating portion in thermal communication with the heat receiving portion and positioned away from the brake pad assembly, said heat dissipating portion arranged for receiving the heat from the heat receiving portion by thermal conduction and, thereafter, for dissipating the heat into a cooling medium to remove the heat from the disk brake system.

* * * * *